Patented Aug. 7, 1934

1,969,355

UNITED STATES PATENT OFFICE 1,969,355

3-CARBOXY-4-ALKOXY-4'-NITRO-DIPHENYL

Walter G. Christiansen, Glen Ridge, N. J., and Adelbert W. Harvey, Pittsburgh, Pa., assignors to E. R. Squibb & Sons, Brooklyn, N. Y., a corporation of New York No Drawing. Application December 23, 1932, Serial No. 648,581

7 Claims. (Cl. 260—111)

This invention relates to nitro derivatives of carboxy-alkoxy-diphenyls, such as the 3-carboxy-4-alkoxy-nitro-diphenyls and salts thereof and more particularly to 3-carboxy-4-ethoxy-4'-nitro-diphenyl and 3-carboxy-4-butoxy-4'-nitro-diphenyl. It includes both the new compounds and a method of preparing them.

These new compounds are valuable as intermediates in the production of end products which have therapeutic value, particularly as local anesthetics.

In preparing the new compounds, it is advantageous to start with 3-carboxy-4-hydroxy-diphenyl prepared by the method disclosed in the application of A. W. Harvey, Serial No. 615,473, filed June 4, 1932, now Patent No. 1,941,207 of Dec. 26, 1933. This compound is first converted to an ether and the ether is then nitrated. The ether is advantageously obtained by forming the disodium derivative of 3-carboxy-4-hydroxy-diphenyl, replacing each of the sodium atoms by an alkyl group and then reforming the carboxylic acid by saponifying the ester and acidifying. The following equation indicates the steps in the reaction:

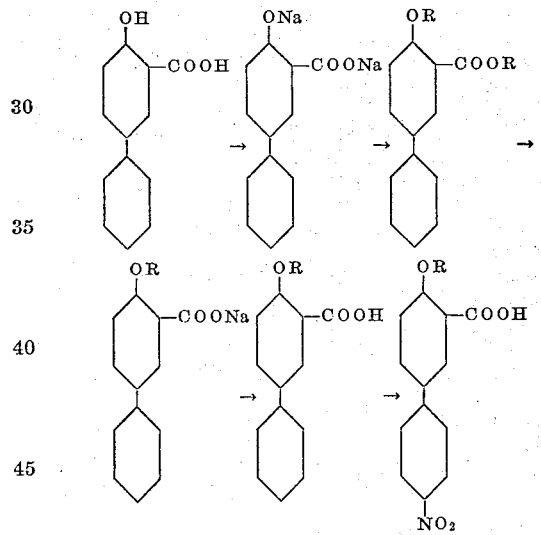

The following examples are illustrative of the process:

Example 1

170 grams of 4-hydroxy-diphenyl is converted into the sodium phenolate by heating to boiling with 40 grams of sodium hydroxide in 400–600 cc. of solution. The sodium phenolate may be recovered by direct evaporation over a free flame or by any other suitable method of evaporation. Care should be taken to prevent absorption of carbon dioxide by the solution or the wet mass during evaporation. Final drying of the phenolate is carried out in vacuo, about 10 mm., at 180° C. for some time, usually five hours, after no more water is collected in an ice trap.

The dry pulverized phenolate is treated with carbon dioxide in an autoclave at approximately 90 pounds per square inch to form the sodium salt of 3-carboxy-4-hydroxy-diphenyl. The temperature is held at 110–120° C., for 1 hour, increased to 160–170° C., and held at the latter temperature for 3–4 hours. The reaction product is placed in 3000–4000 cc. of water, heated to boiling, and then preferably after filtering treated with carbon dioxide until no more 4-hydroxy-diphenyl is precipitated. The suspension is filtered to remove the unconverted 4-hydroxy-diphenyl and the 3-carboxy-4-hydroxy-diphenyl is precipitated by acidification with mineral acid. The product is then filtered off, washed with water and dried.

214 grams of 3-carboxy-4-hydroxy-diphenyl is converted into the disodium derivative (sodium salt and sodium phenolate) by treatment with 80 grams of sodium hydroxide dissolved in 3000–4000 cc. of water. The mixture is boiled until all of the 3-carboxy-4-hydroxy-diphenyl has been dissolved and is then evaporated to dryness. Final drying is conveniently carried out by placing in an oven at 105–110° C. for several hours. The dry disodium compound is treated with 154 grams of ethyl sulfate, or more conveniently with a considerable excess over this amount, and heated for 3–4 hours at 145° C. During the early stages of heating, at 105–120° C., a small quantity of alcohol and ether is distilled off after which no further distillation takes place. Care must be taken to control the temperature to prevent decomposition of the ethyl sulfate with possible sulfonation of the 3-carboxy-4-hydroxy diphenyl or the resulting ethylated derivative. Following the reaction period, the greater part of any excess of ethyl sulfate is removed by distillation in vacuo at a pressure of 13 mm. at about 100° C. The residue, which consists largely of sodium sulfate or sodium ethyl sulfate, depending on the excess of ethyl sulfate used, a small amount of ethyl sulfate and the ethyl ester of 3-carboxy-4-ethoxy-diphenyl is conveniently separated by boiling with water and mechanical separation of the hot aqueous solution from the water insoluble ester.

The free acid, 3-carboxy-4-ethoxy-diphenyl, is made from the ethyl ester by saponification with sodium hydroxide and precipitation with a mineral acid, such as hydrochloric acid. This acid is purified by recrystallization from alcohol.

48.4 grams (0.2 mol.) of 3-carboxy-4-ethoxy-diphenyl is dissolved in 175 cc. of glacial acetic acid by warming to a temperature of 70-80° C. The solution is held at 70-75° C. while a slight excess over 0.2 mol. of nitric acid is added very slowly during 1-2 hours. A satisfactory yield was obtained by adding 14.5 cc. of nitric acid (sp. gr. 1.42) diluted with 50 cc. of glacial acetic acid, during two hours. As an alternative method the nitric acid may be added all at once or in several relatively large proportions, such as twenty to twenty-five percent of the total amount. The solution is preferably mechanically agitated during the addition of the nitric acid, and heating at 70-75° C. should be continued for 1-2 hours after all the nitric acid has been added.

On cooling to room temperature 3-carboxy-4-ethoxy-4'-nitro-diphenyl crystallizes from the reaction mixture. It may be purified by recrystallization from alcohol. The yield obtained by separation from the reaction mixture may be somewhat increased by recovery and purification of the material which remains in solution in the acetic acid. More highly nitrated compounds are present in the acetic acid liquor.

The product crystallizes from alcohol in fine, pale, yellow needles. It has a melting point of 143.0-144.0° C. (corrected).

*Example 2*

42.8 grams (0.2 mol.) of 3-carboxy-4-hydroxy-diphenyl is converted into the disodium derivative by treatment with 16 grams of sodium hydroxide dissolved in 600-800 cc. of water. The mixture is boiled until all of the 3-carboxy-4-hydroxy-diphenyl has been dissolved and is then evaporated to dryness. Final drying is conveniently carried out by placing in an oven at 105-110° C. for several hours.

The dry disodium compound is treated with an excess over 54.8 grams (0.4 mol.) of n-butyl bromide and heated preferably in a closed vessel in a bath maintained at 130° C. for five hours. After cooling, the n-butyl ester of 3-carboxy-4-n-butoxy-diphenyl and excess of n-butyl-bromide is filtered from the by-product sodium bromide and the excess of n-butyl bromide removed by distillation. The residue consists principally of the n-butyl ester of 3-carboxy-4-n-butoxy-diphenyl.

The free acid, 3-carboxy-4-n-butoxy-diphenyl, is obtained by saponification of its n-butyl ester with dilute aqueous-alcoholic solution of sodium hydroxide and precipitation of the free acid from the resulting sodium salt by acidification with mineral acid, such as hydrochloric acid. It is preferable to remove the greater part of the alcohol from the saponification mixture before the acid precipitation.

The compound may be filtered off, dried and purified by crystallization from a mixture of benzene and petroleum ether, or from approximately 60 per cent alcohol. The pure material crystallizes in pure white crystals with a melting point of 83.5-84.5° C. (corrected).

The compound is soluble in alcohol, ether, benzene, chloroform and several other organic solvents.

27.0 grams (0.1 mol.) of 3-carboxy-4-n-butoxy-diphenyl is dissolved in 135 cc. of glacial acetic acid by warming to 70-80° C. The solution, after cooling to 45-50° C. is treated with 8.1 cc. (a slight excess over 0.1 mol.) of nitric acid (sp. gr.=1.42) in 27 cc. of glacial acetic acid. The temperature is then raised to 90° C. during one hour and held at 90-100° C. for 2-3 hours.

The nitrated reaction product, 3-carboxy-4-n-butoxy-4'-nitro-diphenyl is recovered by diluting the reaction mixture with 100 cc. of hot water and allowing to stand until crystallization is complete. The product may be purified by crystallization from 80 percent alcohol followed by recrystallization from a mixture of benzene and petroleum ether. An average yield of about 50 percent may be obtained by the above method and this may be increased by recovery and purification of the material which remains in solution in the diluted acetic acid mother liquor.

The compound crystallizes from a mixture of benzene and petroleum ether in fine, pale yellow needles with a melting point of 102-103° C. (corrected).

The nitro derivatives may be similarly prepared from other 3-carboxy-4-alkoxy-diphenyls formed by using other alkyl halides or salts, such as methyl sulfate in the preparation of the methoxy compound, and alkyl sulfites or alkyl para toluene sulfonates for the preparation of compounds containing more than two carbon atoms in the alkoxy group.

Various salts may be prepared by neutralizing the acid with metal bases.

We claim:

1. A compound having the formula

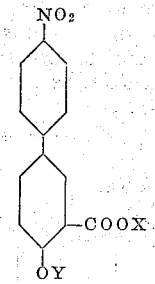

where Y equals alkyl and X equals H or a metal which forms a metal base.

2. 3-carboxy-4-alkoxy-4'-nitro diphenyls.

3. Salts of 3-carboxy-4-alkoxy-4'-nitro diphenyls with metals which form metal bases.

4. 3-carboxy-4-ethoxy-4'-nitro-diphenyl.

5. 3-carboxy-4-butoxy-4'-nitro-diphenyl.

6. The method of preparing 3-carboxy-4-alkoxy-4'-nitro-diphenyls which comprises forming the disodium derivative of 3-carboxy-4-hydroxy-diphenyl, replacing both sodium atoms by alkyl groups, saponifying the resulting ether and then nitrating.

7. The method of preparing 3-carboxy-4-alkoxy-4'-nitro-diphenyls, which comprises esterifying 3-carboxy-4-hydroxy-diphenyl and alkylating the hydroxy group, saponifying the resulting ester and then nitrating.

WALTER G. CHRISTIANSEN.
ADELBERT W. HARVEY.